United States Patent [19]

Hastings

[11] Patent Number: 4,586,849
[45] Date of Patent: May 6, 1986

[54] NUCLEAR DISPOSAL METHOD AND SYSTEM

[75] Inventor: Richard P. Hastings, Washington, Okla.

[73] Assignee: Nuclear Protection Systems, Inc., Norman, Okla.

[21] Appl. No.: 557,730

[22] Filed: Dec. 1, 1983

[51] Int. Cl.⁴ ............................ B09B 1/00; G21F 9/24
[52] U.S. Cl. ...................................... 405/128; 405/55; 252/633
[58] Field of Search ............ 405/53, 55, 57, 128, 405/129, 139, 138; 166/50, 305 D; 220/18; 252/633

[56] References Cited

U.S. PATENT DOCUMENTS

| | | | |
|---|---|---|---|
| 3,108,439 | 10/1963 | Reynolds et al. | 405/128 |
| 3,613,378 | 10/1971 | Dunlap et al. | 405/55 |
| 3,925,992 | 12/1975 | Bäckström | 405/53 |
| 4,189,254 | 2/1980 | Akesson | 405/128 |
| 4,192,629 | 3/1980 | Hallenius et al. | 405/128 |
| 4,350,461 | 9/1982 | Valiga et al. | 405/128 |
| 4,375,930 | 3/1983 | Valiga | 405/128 |
| 4,453,857 | 6/1984 | Serra et al. | 405/128 |

Primary Examiner—Cornelius J. Husar
Assistant Examiner—Nancy J. Stodola
Attorney, Agent, or Firm—Seidel, Gonda, Goldhammer & Abbott

[57] ABSTRACT

Radioactive waste material is permanently stored without the need of constant surveillance by depositing the material in a cavity located in a rock formation above the water table and between two layers of water impervious rock. Preferably the entrance to the cavity is located in a mountainside or bluff in a layer between the two water impervious layers, which layer is more easily penetrable than the two water impervious layers. The cavity may include a passage which is reinforced with a reinforcement material such as concrete and is surrounded by a plurality of boreholes to aid in dissipating the heat of decay.

8 Claims, 3 Drawing Figures

4,586,849

NUCLEAR DISPOSAL METHOD AND SYSTEM

BACKGROUND OF THE INVENTION

1. Field of the Invention

This invention relates generally to nuclear waste disposal methods and systems, and more particularly, concerns a method and system which prevents leaching of the disposed waste.

2. Prior Art

The advantages of storing nuclear waste underground are generally known, for example see Hallenius et al. U.S. Pat. No. 4,192,629.

As indicated in Hallenius et al., the problem of radiolysis of ground water has been known. Radiolysis is the chemical disintegration of material exposed to radiation. This phenomenon causes water adjacent to a radiation source, such as radioactive waste, to attain a much higher oxygen content and therefore the water becomes highly corrosive. This increases the risk of direct contact between the radioactive waste and the ground water due to the complete corrosion of the walls of the casing in which the radioactive waste is stored.

The solution to this problem set forth in Hallenius et al. is to line the cavity in the hollowed out rock with a plastic deformable material to prevent contact between the ground water and the casing. The use of the plastic material results in additional expense and also reduces the effective storage volume of the cavity.

OBJECT OF THE INVENTION

A principal object of the present invention is to provide for the permanent disposal of radioactive waste by means which is safe and economical.

A further object is to provide such storage which is not accessible to ground water.

A still further object is to provide such storage which takes advantage of the natural ground formation.

Other objects and advantages will appear hereinafter.

SUMMARY OF THE INVENTION

In accordance with the invention, permanent disposal, that is safe isolation of waste from the environment requiring no further surveillance or other effort, is obtained by locating the radioactive waste storage cavity in a bluff or other prominent rock formation above the ground surface water level and between two layers of rock which are substantially impervious to water. The layers of rock protect the disposal cavity from both ground water seeping up from below and rain water from the surface. Therefore, radiolysis and the resulting corrosion is eliminated or at least deterred.

Further, by locating the cavity in a relatively soft more easily penetrated layer between the two impervious layers minimizes the cost of construction. Preferably, the cavity entrance is at the side of the bluff or mountain where the soft and possibly water permeable material is exposed, thereby further minimizing construction cost by eliminating the need for a vertical shaft through the upper layer of water impervious rock.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
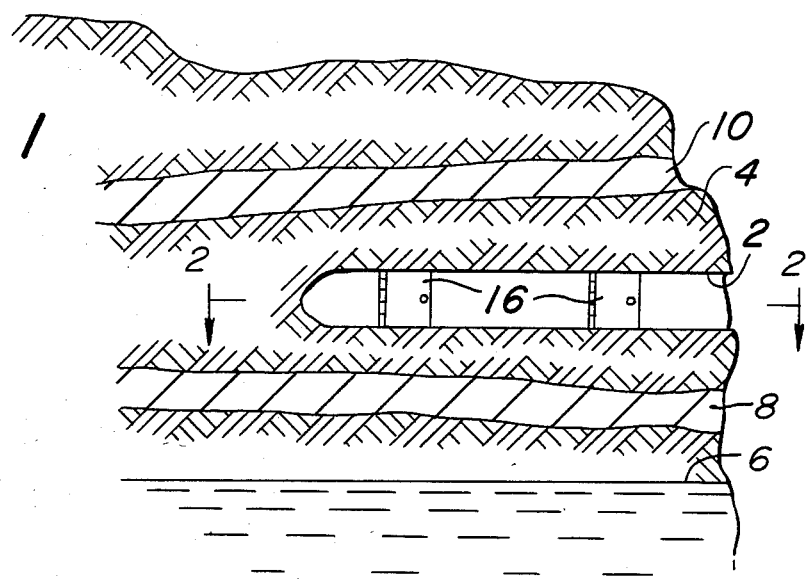
FIG. 1 is a vertical section through the disposal site of the present invention.

Referring to FIG. 1, the repository for the storage of radioactive material of the present invention is constructed by boring substantially horizontal shafts 2 into the side of a mountain, or preferably a bluff 4. By selecting the disposal cite in a bluff, construction costs are reduced by eliminating the need to drill a vertical access shaft. Another advantage in such site selection is that the shaft 2 may be located above the water table 6. This reduces the risk that underground water will come into contact with the stored radioactive waste container which would lead to radiolysis discussed in the prior art section above and eventual leakage of the radioactive waste material.

To further insure against the contact of water with the radioactive waste containers, the shaft 2 is located between two layers of rock 8, 10 which layers are substantially impervious to water. The lower layer of rock 8 affords additional protection from the water table. The upper layer of rock 10 protects the repository from surface waters, such as rain water. Rather than percolating through the upper layer 10, any surface waters would be diverted to the face of the bluff by the rock layer 10.

Figure 2:
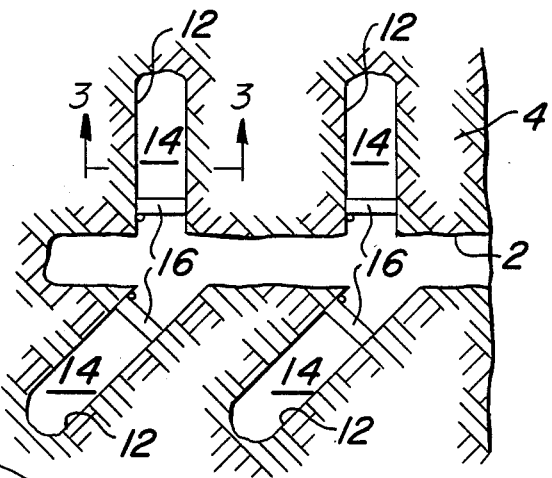
FIG. 2 is a horizontal section of the disposal site showing the passageways of the nuclear disposal system.

As most clearly shown in FIG. 2, side passages 12 in which the radioactive waste is stored lead off from the main shaft 2. As shown, the angle between the main shaft and the side passages may be perpendicular or any other angle.

The radioactive waste material is stored at the end of the side passages in the storage areas 14 behind barriers 16. The barriers 16 may be constructed of or lined with lead or other shielding material and may be constructed to seal off the storage areas 14.

Figure 3:
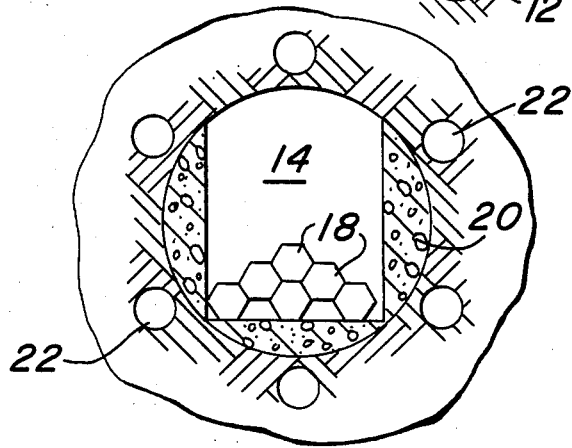
FIG. 3 is a section taken on line 3—3 of FIG. 2.

FIG. 3 shows the radioactive waste material casings or containers 18 stacked in a storage area 14. The walls and floor of the storage area may be reinforced with a reinforcement material 20, such as concrete. Further, to remove the heat generated by the decay of the radioactive materials, boreholes 22 may be drilled around the storage area.

Thus, it is apparent that there has been provided, in accordance with the invention, and economical repository for the permanent storage of radioactive material which protects the waste material containers from contact with water. Therefore, corrosion of the containers is deterred and storage of the radioactive waste material may be on a permanent basis without the need for continuous surveillance.

The present invention may be embodied in other specific forms without departing from the spirit or essential attributes thereof and, accordingly, reference should be made to the appended claims, rather than to the foregoing specification, as indicating the scope of the invention.

I claim:

1. A repository for the storage of radioactive material and other materials comprising a rock formation located above the water table in which a cavity is formed, the location of the cavity being between two substantially horizontal vertically separated layers of rock and within an intermediate layer, said intermediate layer being between said layers of rock, said layers of rock being substantially impervious to water, said intermediate layer which is more easily penetrated than the two layers of impervious rock and cavity sealing means disposed within said cavity.

2. A repository according to claim 1 in which the cavity is located in a mountainside or a bluff.

3. A repository in accordance with claim 1 wherein the layers of rock are granite.

4. A repository in accordance with claim 1 in which the cavity includes a passage having its sides and base reinforced with a reinforcement material.

5. A repository in accordance with claim 4 in which the reinforcement material is concrete.

6. A repository in accordance with claim 4 in which the passage is surrounded by a plurality of boreholes.

7. A repository for storage of radioactive material comprising two layers of substantially water impervious rock located above the water table, one of said layers being above and one of said layers being below a layer of more easily penetrable material in which a cavity is formed, said layers of rock being substantially horizontal and vertical separated, the cavity being located in a mountainside or bluff and including a passage having its sides and base reinforced with a reinforcement material and a plurality of boreholes surrounding the cavity and cavity sealing means disposed within said cavity.

8. A method for the permanent storage of radioactive material and other materials without the need for constant surveillance comprising storing the material in a cavity formed in a rock formation located above the water table between two layers of substantially water impervious rock, said layers of rock being substantially horizontal and vertically separated, an intermediate layer between said layers of rock, said intermediate layer being more easily penetrated than said two layers of impervious rock, said cavity being within said intermediate layer, and cavity sealing means disposed within said cavity.

* * * * *